(12) United States Patent
Vargantwar et al.

(10) Patent No.: US 9,468,035 B2
(45) Date of Patent: Oct. 11, 2016

(54) INTELLIGENT RADIO RESOURCE CONTROL (RRC) CONNECTION RE-ESTABLISHMENT

(71) Applicant: Verizon Patent and Licensing Inc., Arlington, VA (US)

(72) Inventors: Sachin Vargantwar, Alpharetta, GA (US); Rodrigo Teliaken Rodelas, Alpharetta, GA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 277 days.

(21) Appl. No.: 14/335,998

(22) Filed: Jul. 21, 2014

(65) Prior Publication Data

US 2016/0021697 A1    Jan. 21, 2016

(51) Int. Cl.
*H04W 76/02*    (2009.01)

(52) U.S. Cl.
CPC ................ *H04W 76/028* (2013.01)

(58) Field of Classification Search
CPC ......... H04W 76/028; H04W 36/0055; H04W 36/245; H04W 76/046; H04W 76/027; H04W 72/1284; H04W 24/02; H04W 24/08
See application file for complete search history.

(56) References Cited

U.S. PATENT DOCUMENTS

| | | | | |
|---|---|---|---|---|
| 2011/0080825 A1* | 4/2011 | Dimou | ............... | H04J 11/0086 370/216 |
| 2011/0117905 A1* | 5/2011 | Huang | ............... | H04W 76/028 455/422.1 |
| 2011/0122843 A1* | 5/2011 | Iwamura | ............... | H04W 12/04 370/331 |
| 2013/0182555 A1* | 7/2013 | Raaf | ............... | H04W 36/0033 370/216 |
| 2014/0155068 A1* | 6/2014 | Porat | ............... | H04W 36/0055 455/437 |
| 2014/0233516 A1* | 8/2014 | Chun | ............... | H04W 24/08 370/329 |
| 2015/0009802 A1* | 1/2015 | Wager | ............... | H04W 76/027 370/218 |
| 2015/0078184 A1* | 3/2015 | Lee | ............... | H04W 64/006 370/252 |
| 2015/0304853 A1* | 10/2015 | Murray | ............... | H04W 76/068 455/454 |
| 2015/0373611 A1* | 12/2015 | Liu | ............... | H04W 36/0083 455/436 |
| 2015/0373754 A1* | 12/2015 | Wu | ............... | H04W 24/10 370/329 |
| 2016/0014839 A1* | 1/2016 | Liu | ............... | H04W 76/028 370/329 |

* cited by examiner

*Primary Examiner* — Hoang-Chuong Vu (57) ABSTRACT

A mobile device, or a server in communication with the mobile device, identifies a failure scenario for previously-failed radio resource control (RRC) connection re-establishment requests, from the mobile device, in a Long-Term Evolution (LTE) network. The mobile device, or server, monitors real-time context data for a match with the failure scenario and applies preemptive settings for an upcoming RRC connection re-establishment attempt in response to identifying a match with the failure scenario. The preemptive settings are configured to maintain an active session between the mobile device and the LTE network.

20 Claims, 8 Drawing Sheets

INTELLIGENT RADIO RESOURCE CONTROL (RRC) CONNECTION RE-ESTABLISHMENT

BACKGROUND

Wireless communication networks are commonly used to communicate information regardless of where a user is located and whether a user is stationary or moving. Generally, wireless communication networks are established through a mobile device (or "user equipment (UE)") communicating with a series of base stations (or "access nodes"). As a mobile device moves from one location serviced by a first access node to a second location serviced by a second access node, a communication "handoff" will be performed such that the mobile device stops communicating via the first access node and starts communicating via the second access node. Due to a variety of factors, such handoffs can be very complex.

DETAILED DESCRIPTION OF PREFERRED EMBODIMENTS

The following detailed description refers to the accompanying drawings. The same reference numbers in different drawings may identify the same or similar elements.

Systems and methods described herein provide solutions implemented by a mobile device to prevent handover problems related to radio resource control (RRC) connection re-establishment procedures in previously-identified problem areas.

Figure 1A:
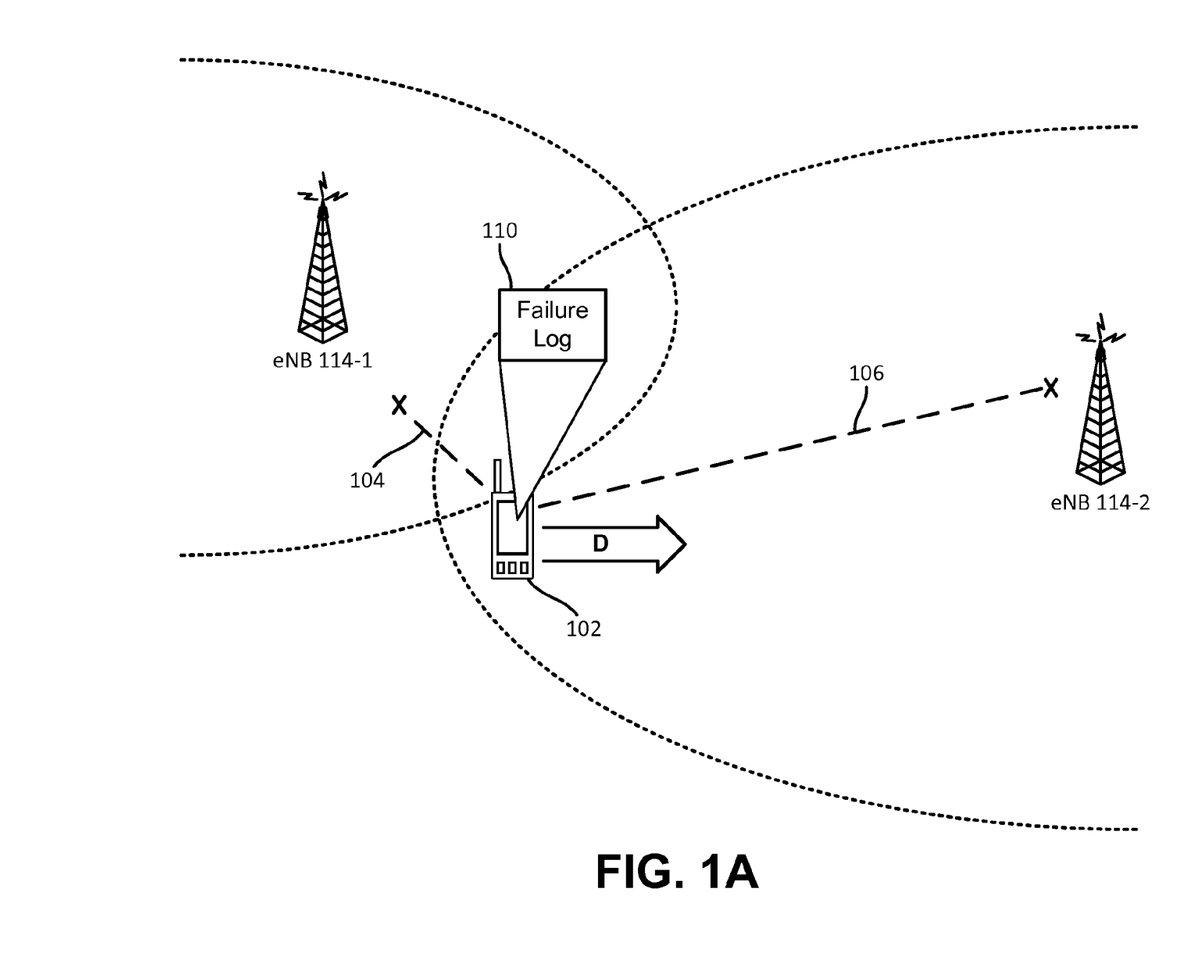
FIGS. 1A and 1B are diagrams illustrating concepts described herein.
Figure 1B:
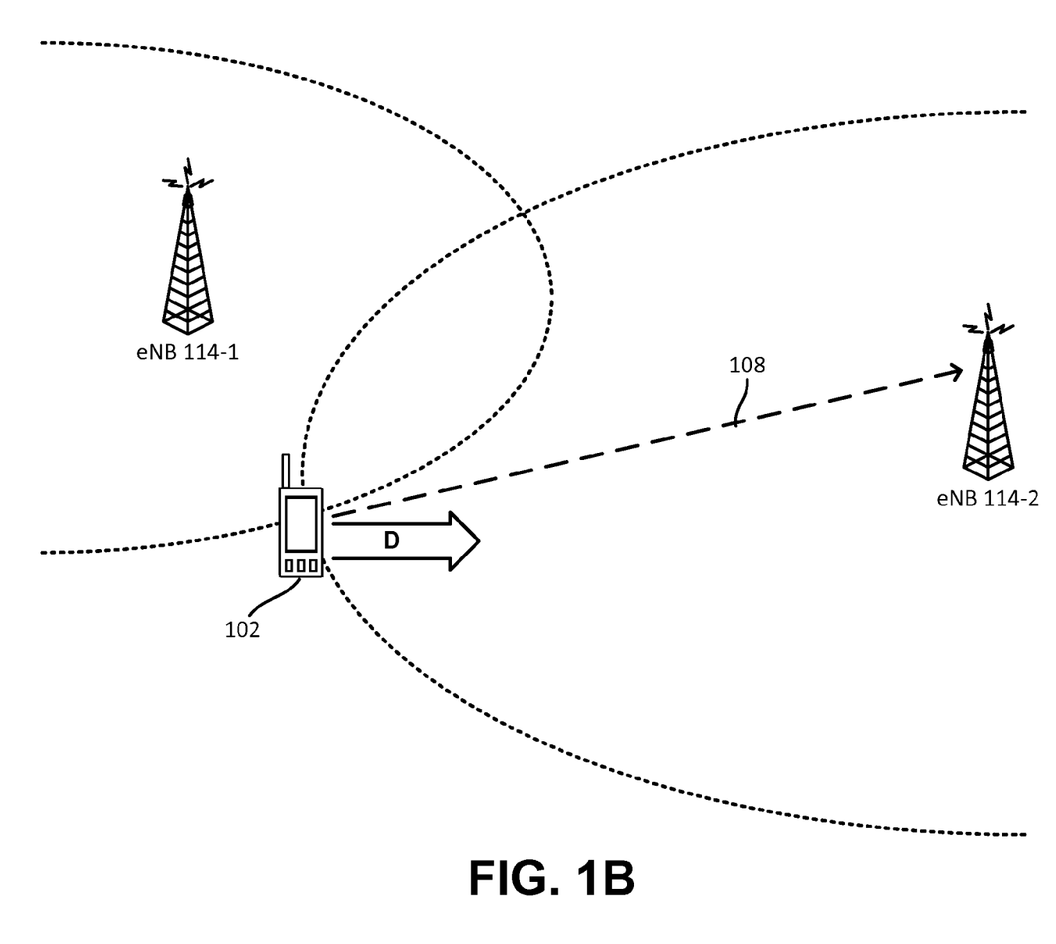

FIGS. 1A and 1B are diagrams illustrating concepts described herein. Voice over Long Term Evolution (VoLTE) uses RRC protocol for call set up and maintenance, including mobility. RRC protocol includes a RRC connection re-establishment procedure, where if user equipment (e.g., UE device 102) drops a connection, it can send a RRC connection re-establishment request to the best access node. The access node is only able to accept the connection if the context for UE device 102 is alive. Due to delays involved in handoffs, it may be difficult to achieve the timely communication of the UE context and the identification of the best access node needed for a successful RRC connection re-establishment procedure.

As shown in FIG. 1A, UE device 102 may be moving in a direction "D" from an area serviced by an eNodeB 114-1 to an area serviced by an eNodeB 114-2. If UE device 102 detects a connection failure with eNodeB 114-1, such as a radio link failure or a handover failure, UE device 102 will send a RRC connection re-establishment request 104, to eNodeB 114-1. However, if the radio frequency (RF) signal quality from eNodeB 114-1 is poor, eNodeB 114-1 may not receive the request and the connection re-establishment process is not started. UE device 102 may wait for an established period (e.g., a T301 timer value as indicated in the 3GPP standard).

Meanwhile, while moving in the direction "D" shown, UE device 102 may measure RF signals from eNodeB 114-2 that become stronger than RF signals from eNodeB 114-1. After the wait period for RRC connection re-establishment request 104, upon receiving no response from eNodeB 114-1, UE device 102 may send an RRC re-establishment request 106 to eNodeB 114-2. However, the context of UE device 102 is not available to eNodeB 114-2. Thus, eNodeB 114-2 does not recognize UE device 102 and rejects RRC re-establishment request 106. The rejection of RRC re-establishment request 106 results in a dropped call or session for UE device 102.

According to implementations described herein, UE device 102 may record the particulars leading to the rejection of RRC re-establishment request 106. For example, UE device 102 may maintain a failure log 110 of rejected RRC re-establishment requests. Failure log 110 may include, for example, a location, time, direction, speed, wait times, etc., associated with each RRC re-establishment request.

Referring to FIG. 1B, at a later time, UE device 102 may encounter the same transition region between eNodeB 114-1 and eNodeB 114-2. For example, eNodeB 114-1 and eNodeB 114-2 may be located along a commuting route (e.g., from home to work) that UE device 102 traverses on a regular basis. Based on information in failure log 110, UE device 102 may apply predictive intelligence to alter default procedures for the handover (also referred to herein as a handoff) between eNodeB 114-1 and eNodeB 114-2. For example, UE device 102 may again measure that radio frequency (RF) signals from eNodeB 114-2 that become stronger than RF signals from eNodeB 114-1. However, based on previous failure information, UE device 102 can send a RRC re-establishment request 108 directly to eNodeB 114-2 prior to a connection failure with eNodeB 114-1. eNodeB 114-2 can, thus, receive RRC re-establishment request 108 and can obtain the context of UE device 102. eNodeB 114-2 can then accept RRC re-establishment request 108 and avoid a dropped call or session for UE device 102.

Figure 2:
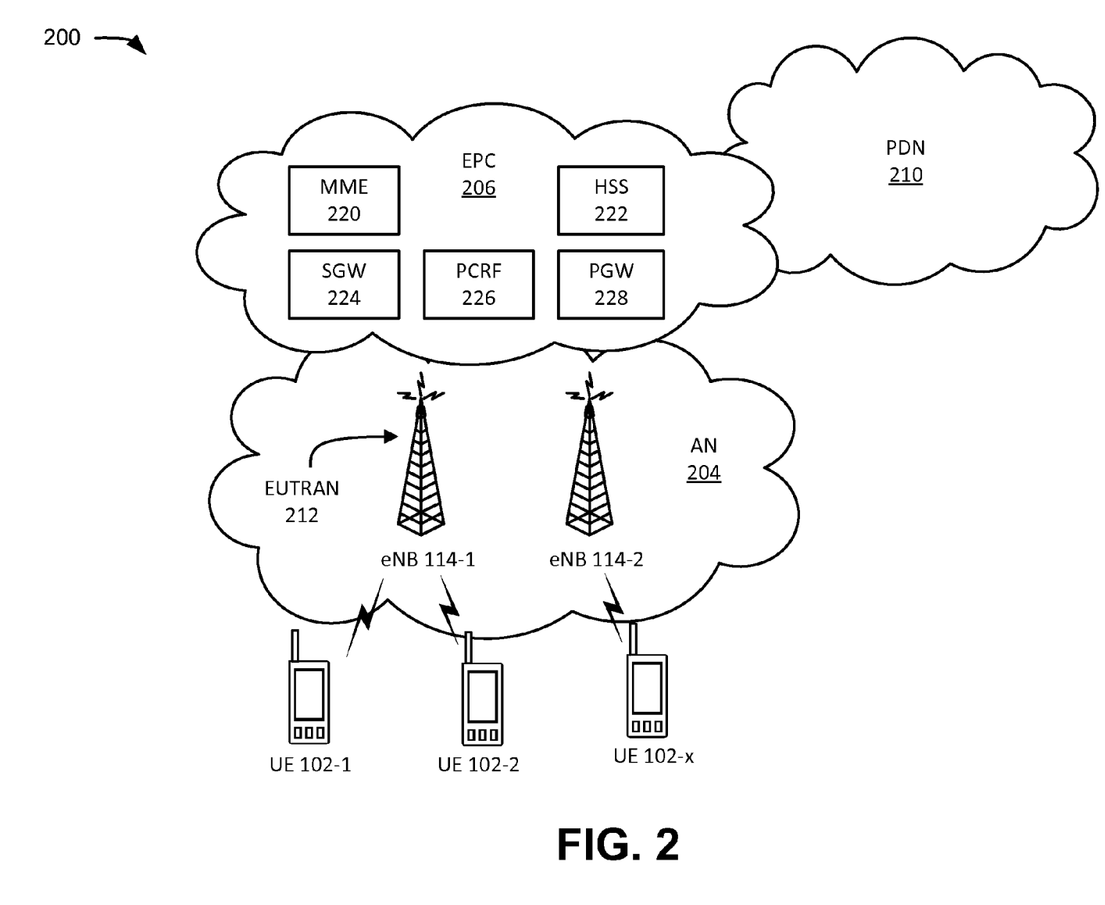
FIG. 2 is a diagram illustrating an exemplary network in which systems and/or methods described herein may be implemented.

FIG. 2 is a diagram illustrating an exemplary network environment 200 in which systems and methods described herein may be implemented. As illustrated, network environment 200 may include a number of user equipment (UE) devices 102-1, 102-2 and 102-x (collectively referred to as UE devices 102 or individually as UE device 102), an access network 204, an evolved packet core (EPC) 206, and a packet data network (PDN) 210, such as the Internet or a proprietary packet data network. Access network (AN) 204 may include an evolved universal terrestrial radio access network (E-UTRAN) 212 and a number of eNodeBs (eNBs) 114-1 and 114-2 (collectively referred to as eNBs 114 or individually as eNB 114). EPC 206 may include a mobility management entity (MME) 220, a home subscriber server (HSS)/authentication, authorization, and accounting (AAA) server 222, a serving gateway (SGW) 224, policy and charging rules function (PCRF) device 226, and a PDN gateway (PGW) 228. Devices/networks of environment 200 may interconnect via wired and/or wireless connections.

Three UEs 102, access network 204, EPC 206, PDN 210, E-UTRAN 212, two eNBs 114, MME 220, HSS 222, SGW 224, PCRF 226, PGW 228 have been illustrated in FIG. 2 for simplicity. In practice, there may be more or fewer devices or components. For example, a typical network environment 200 may include millions of subscriber UEs 102, thousands of eNBs 114, hundreds of SGWs 224 and several PGWs 228 effectively forming a hierarchical access network in which traffic passes from PDN 210 to UE device 102 via a particular PGW 228, SGW 224, and eNB 114.

UE device 102 may include mobile device, such as a radiotelephone, a personal communications system (PCS) terminal (e.g., that may combine a cellular radiotelephone with data processing and data communications capabilities), a wireless telephone, a cellular telephone, a smart phone, a personal digital assistant (PDA) (e.g., that can include a radiotelephone, a pager, Internet/intranet access, etc.), a laptop computer, a personal computer, or other types of computation or communication devices. In an exemplary implementation, UE devices 102 may include any device that is capable of communicating over access network 204, EPC network 206, and/or PDN 210. UE device 102 operates according to one or more versions of the LTE communication standard, or according to other communications standards.

Access network 204 includes a communications network that connects subscribers (e.g., UE device 102) to a service provider. In one example, access network 204 may include a Wi-Fi network or other access networks (e.g., in addition to E-UTRAN 212). EPC 206 includes a core network architecture of the 3GPP LTE wireless communication standard. PDN 210 includes a network that provides data services (e.g., via packets or any other IP datagrams). For example, PDN 210 may include the Internet, an intranet, an asynchronous transfer mode (ATM) network, etc.

E-UTRAN 212 includes a radio access network capable of supporting high data rates, packet optimization, large capacity and coverage, etc. eNBs 114 include network devices or access nodes that operate according to one or more versions of the LTE communication standard. For example, eNBs 114 may be configured to respond to UE requests, forward information regarding UEs 102 to MME 220 and/or SGW 224, set up tunneling sessions with other devices (e.g., SGW 224 and PGW 228), etc.

MME 220 is responsible for idle mode tracking and paging procedures (e.g., including retransmissions) for UE device 102. For example, MME 220 maintains information regarding a current state (e.g., powered on, location, etc.) of UE device 102. MME 220 is also involved in the bearer activation/deactivation process (e.g., for UE device 102) and operates to choose a particular SGW 224 for UE device 102 at an initial attach time and at a time of intra-LTE handover. In addition, MME 220 authenticates UE device 102 (e.g., via interaction with HSS 222). Non-access stratum (NAS) signaling terminates at MME 220, and MME 220 generates and allocates temporary identities to UEs (e.g., UE device 102). MME 220 may be a termination point in EPC network 206 for ciphering/integrity protection for NAS signaling and may handle security key management. MME 220 may provide a control plane function for mobility between LTE and 2G/3G 3GPP access networks with an S3 interface terminating at MME 220. MME 220 may also terminate an S6a interface towards HSS 222 for roaming UEs.

HSS/AAA 222 is configured to include a master user database that supports devices on PDN 210 that handle calls, such as proxy devices, session border controllers, etc. HSS/AAA 222 may contain subscription-related information (e.g., subscriber profiles), may perform authentication and authorization of a user based on requests received from MME 220, and may provide information about a subscriber's location and IP information.

SGW 224 routes and forwards user data packets, acts as a radio mobility anchor for a user plane during inter-eNB handovers, and also acts as an radio anchor for mobility between LTE and other 3GPP technologies (referred to as "inter-3GPP mobility"). SGW 224 is connected to eNBs 114 to provide a radio layer mobility control plane. In addition, SGW 224 manages and stores contexts associated with UE device 102 (e.g., parameters of an IP bearer service, network internal routing information, etc.).

PCRF 226 provides policy control decision and flow based charging control functionalities. PCRF 226 may provide network control regarding service data flow detection, gating, quality of service (QoS) and flow based charging, etc. PCRF 226 may determine how a certain service data flow shall be treated, and may ensure that user plane traffic mapping and treatment is in accordance with a user's subscription profile.

PGW 228 includes one or more data transfer devices (or network devices), such as a gateway, a router, a switch, a firewall, a network interface controller (NIC), a hub, a bridge, a proxy server, an optical add/drop multiplexer OADM, or some other type of device that processes and/or transfers data. PGW 228 provides connectivity of UE device 102 to external packet data networks (e.g., to PDN 210) by being a traffic exit/entry point for UE device 102. As described briefly above, UE device 102 may connect to PGW 228 via one or more tunnels established between eNB 114 and PGW 228, such as one or more GPRS Tunneling Protocol (GTP) tunnels. UE device 102 may simultaneously connect to more than one PGW for accessing multiple PDNs. PGW 228 may perform policy enforcement, packet filtering for each user, charging support, lawful intercept, and packet screening. PGW 228 may also act as an anchor for mobility between 3GPP and non-3GPP technologies.

Figure 3:
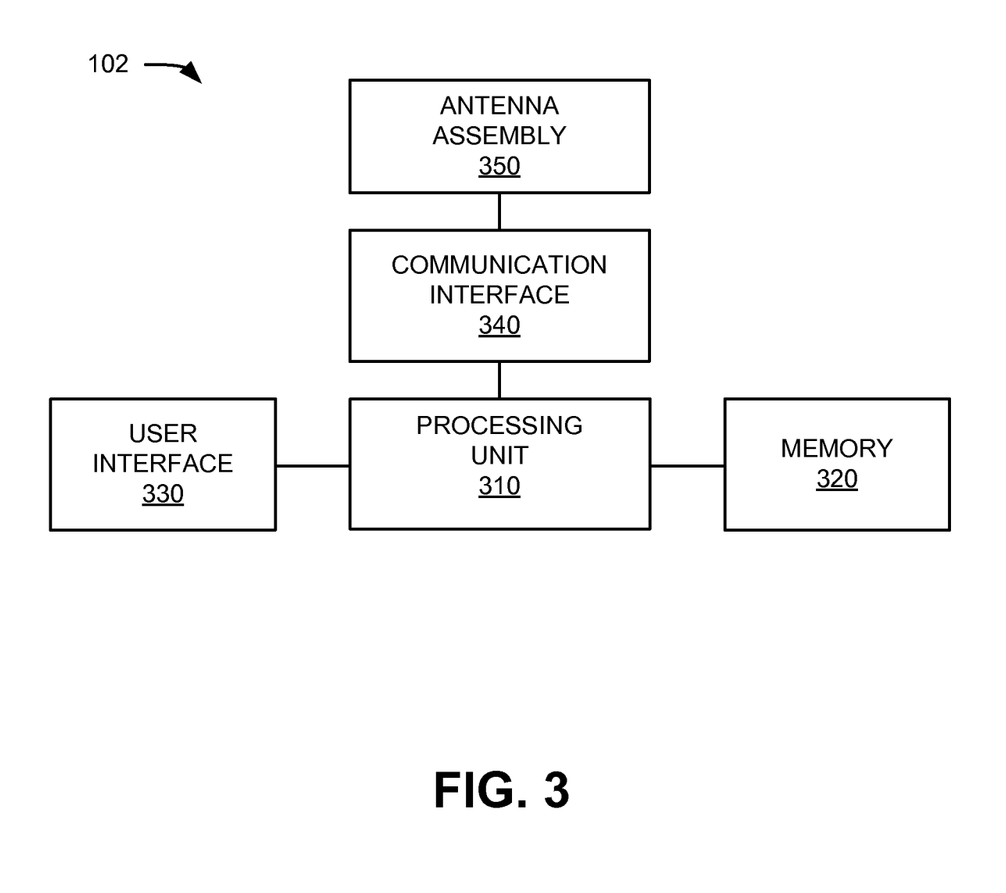
FIG. 3 is a block diagram illustrating exemplary components of a mobile device of FIG. 2.

FIG. 3 is a diagram illustrating exemplary components of UE device 102. As shown in FIG. 3, UE device 102 may include a processing unit 310, a memory 320, a user interface 330, a communication interface 340, and an antenna assembly 350.

Processing unit 310 may include one or more processors, microprocessors, application specific integrated circuits (ASICs), field programmable gate arrays (FPGAs), and/or other processing logic. Processing unit 310 may control operation of UE device 102 and its components.

Memory 320 may include a random access memory (RAM) or another type of dynamic storage device, a read only memory (ROM) or another type of static storage device, a removable memory card, and/or another type of memory to store data and instructions that may be used by processing unit 310.

User interface 330 may allow a user to input information to UE device 102 and/or to output information from UE device 102. Examples of user interface 330 may include a speaker to receive electrical signals and output audio signals; a camera to receive image and/or video signals and output electrical signals; a microphone to receive sounds and output electrical signals; buttons (e.g., a joystick, control buttons, a keyboard, or keys of a keypad) and/or a touchscreen to receive control commands; a display, such as a liquid crystal display (LCD), to output visual information; an actuator to cause UE device 102 to vibrate; a sensor; and/or any other type of input or output device.

Communication interface 340 may include a transceiver that enables UE device 102 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 340 may include a transmitter that converts baseband signals to radio frequency (RF) signals and/or a receiver that converts RF signals to baseband signals. Communication interface 340 may be coupled to antenna assembly 350 for transmitting and receiving RF signals.

Communication interface 340 may include a logical component that includes input and/or output ports, input and/or output systems, and/or other input and output components that facilitate the transmission of data to other devices. For example, communication interface 340 may include a network interface card (e.g., Ethernet card) for wired communications and/or a wireless network interface (e.g., a WiFi) card for wireless communications. Communication interface 340 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

Antenna assembly 350 may include one or more antennas to transmit and/or receive RF signals. Antenna assembly 350 may, for example, receive RF signals from communication interface 340 and transmit the signals via an antenna and receive RF signals from an antenna and provide them to communication interface 340.

As described herein, UE device 102 may perform certain operations in response to processing unit 310 executing software instructions contained in a computer-readable medium, such as memory 320. A computer-readable medium may be defined as a non-transitory memory device. A non-transitory memory device may include memory space within a single physical memory device or spread across multiple physical memory devices. The software instructions may be read into memory 320 from another computer-readable medium or from another device via communication interface 340. The software instructions contained in memory 320 may cause processing unit 310 to perform processes that will be described later. Alternatively, hard-wired circuitry may be used in place of, or in combination with, software instructions to implement processes described herein. Thus, implementations described herein are not limited to any specific combination of hardware circuitry and software.

Although FIG. 3 shows example components of UE device 102, in other implementations, UE device 102 may include fewer components, different components, differently-arranged components, or additional components than those depicted in FIG. 3. Additionally or alternatively, one or more components of UE device 102 may perform the tasks described as being performed by one or more other components of UE device 102.

Figure 4:
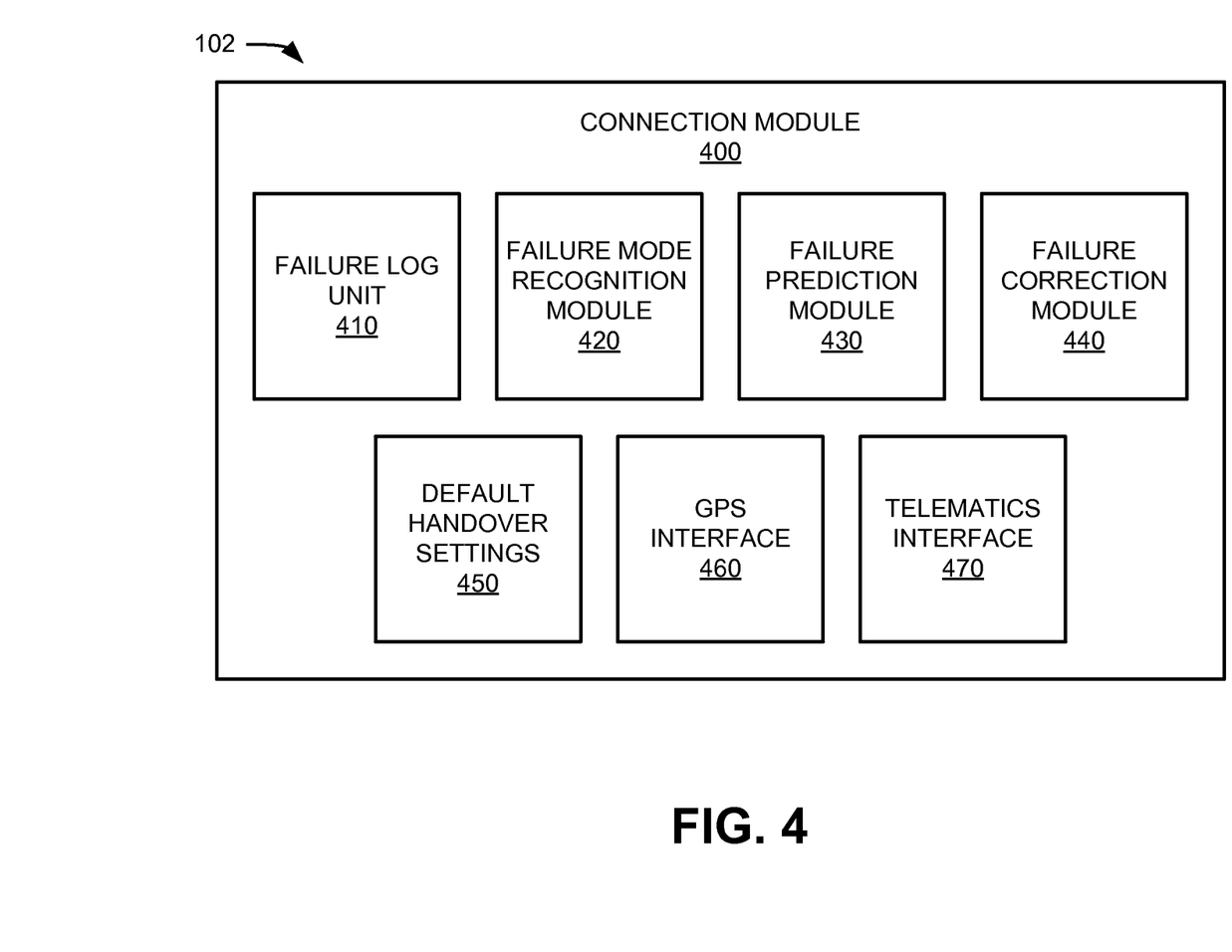
FIG. 4 is a block diagram illustrating exemplary functional components of the mobile device of FIG. 2.

FIG. 4 is a block diagram illustrating an exemplary functional component of UE mobile device 102. The functional components of FIG. 4 may be implemented, for example, by processing unit 310 in conjunction with memory 320. As shown in FIG. 4, UE device 102 may include a connection module 400 including a failure log unit 410, a failure mode recognition module 420, a failure prediction module 430, a failure correction module 440, a default handover settings 450, a global positioning system (GPS) interface 460, and a telematics interface 470.

Generally, connection module 400 may track failed handover behavior and take corrective, proactive action to avoid dropping a VoLTE call when recognizable conditions are encountered. Carrying out such proactive actions may require connection module 400 to use artificial intelligence or other programmed logic to record, store, and analyze handover statistics and results.

Failure log unit 410 may monitor and record details of failed handovers and/or RRC connection re-establishment procedures for UE device 102. In one implementation, failure log unit 410 may communicate with one or more other devices to collect data that may be directly or indirectly associated with a failed handover. For example, failure log unit 410 may collect data to supplement network-based details for a failed handover event or failed RRC connection re-establishment event. In addition to timing and network component information available from components of access network 204 and/or EPC 206, failure log unit 410 may collect context data from a GPS unit, a vehicle telematics unit, or other another data collection unit within, or in communication with, UE device 102. Failure log unit 410 may store details of failed handovers and/or RRC connection re-establishment procedures in a failure log (e.g., failure log 110).

Data collected by failure log unit 410 may include various data fields, such as, for example, an eNodeB identifier field, signal strength data field, time fields, location fields, direction fields, speed fields, and/or other data fields associated with UE device 102 and access network 204 in the timeframe of a failed handover or RRC connection re-establishment event. Each eNodeB identifier may include a unique identifier for each eNodeB 114. Signal strength data may include RF signal strength from one or more sites (e.g., a cell tower or eNodeBs) before and after a failure event (e.g., a failed handover, dropped call, etc.). Additionally, or alternatively, signal strength data may include one or more signal-to-interference-plus-noise ratio (SINR) values or packet error rate (PER) values.

Times may include a time of day that a failed handover event or failed RRC connection re-establishment event occurred. Locations may include location coordinates, such as GPS coordinates, triangulation coordinates, a map location, or other location data, at the time of a failed handover event or failed RRC connection re-establishment event. Directions may include a vector, a street route, or another directional indication. Speeds may include a vector, a GPS reading, a speedometer reading, etc. In one implementation, failure event data for a particular event may be stored in a hash table.

Failure mode recognition module 420 may compare stored data from failure log unit 410 to identify a failure scenario. In one implementation, failure mode recognition module 420 may be configured to detect a particular number of failures (e.g., "x" number of failures) with similar conditions before identifying a failure scenario. A failure scenario may identify, for example, particular eNodeBs 114, signal strengths, locations, vectors, etc., corresponding to repeated RRC connection re-establishment failures. In one implementation, the failure scenario may identify context data (e.g., signal data, location, speed, direction, etc.) just prior to the failure to allow for future prediction of a failure. Failure mode recognition module 420 may record the failure scenario, for example, in a memory (e.g., memory 320) of UE device 102 (e.g., in failure log 110). According to another implementation, failure mode recognition module 420 may provide recorded failure scenarios to MME 220 or anther device in EPC 206 enable a service provider to identify failures from multiple UE devices 102 and to permit corrective action at a network level.

Failure prediction module 430 may monitor current conditions, such as conditions corresponding to any of the data fields collected by failure log unit 410. In one implementation, failure prediction module 430 may monitor conditions in real time (or near-real time) to identify conditions that match a failure scenario (e.g., a failure scenario previously identified by failure mode recognition module 420). For example, failure prediction module 430 may compare a current location, direction, speed, and signal strength with a stored failure scenario to predict a handover failure event. In one implementation, if failure prediction module 430 matches current conditions to a known failure scenario, failure prediction module 430 can provide a signal to failure correction module 440 to initiate a preemptive corrective action.

Failure correction module 440 may identify actions (e.g., beyond normal LTE default actions) to achieve a successful RRC re-establishment process. For example, failure correction module 440 may adjust settings for wait timers (e.g. timers as provided in 3GPP TS36.331) or initiate preemptive handovers to avoid repeating a known failure scenario. In one implementation, failure correction module 440 may monitor success of corrective attempts and update failure scenarios when a corrective attempt is not successful to prevent a failed handover or failed RRC connection re-establishment procedure for UE device 102. In one implementation, when a corrective attempt is successful to prevent a failed handover or failed RRC connection re-establishment procedure, failure correction module 440 may store the corrective action in association with the corresponding failure scenario. The stored corrective action may be retrieved by failure correction module 440 in place of standard procedures to address the particular failure scenarios in the future, and to avoid failures during a communication session involving UE device 102.

Default handover settings 450 may include standard/default protocols for handovers and RRC connection re-establishment procedures. For example, default handover settings 450 may include wait times defined in 3GPP TS36.331 or by a service provider for access network 204. According to implementation described herein, default handover settings 450 may be used by connection module 400 when a particular failure scenario is not otherwise identified by (e.g., by failure prediction module 430).

GPS interface 460 may include a communication interface with a GPS unit inside or outside of UE device 102. GPS interface 460 may allow failure log unit 410 and failure prediction module 430 to identify location-based context information. The location-based context information (e.g., a location, a vector, a speed, a direction, etc.) may be collected, for example, by failure log unit 410 in conjunction with a failed handover or a failed RRC connection re-establishment. Additionally, the location-based context information may be collected, for example, by failure prediction module 430 to detect a particular failure scenario. In another implementation, GPS interface 460 may communicate with another location-determining unit, such as a triangulation-based location detection system or a navigation system.

Telematics interface 470 may include a communication interface with a telematics unit, such as an OEM or aftermarket vehicle telematics unit. Telematics interface 470 may allow failure log unit 410 and failure prediction module 430 to identify vehicle-related context information. The vehicle-related context information (e.g., a location, a speed, a direction, acceleration, etc.) may be collected, for example, by failure log unit 410 in conjunction with a failed handover or a failed RRC connection re-establishment. Additionally, the vehicle-related context information may be collected, for example, by failure prediction module 430 to detect a particular failure scenario.

Figure 5:
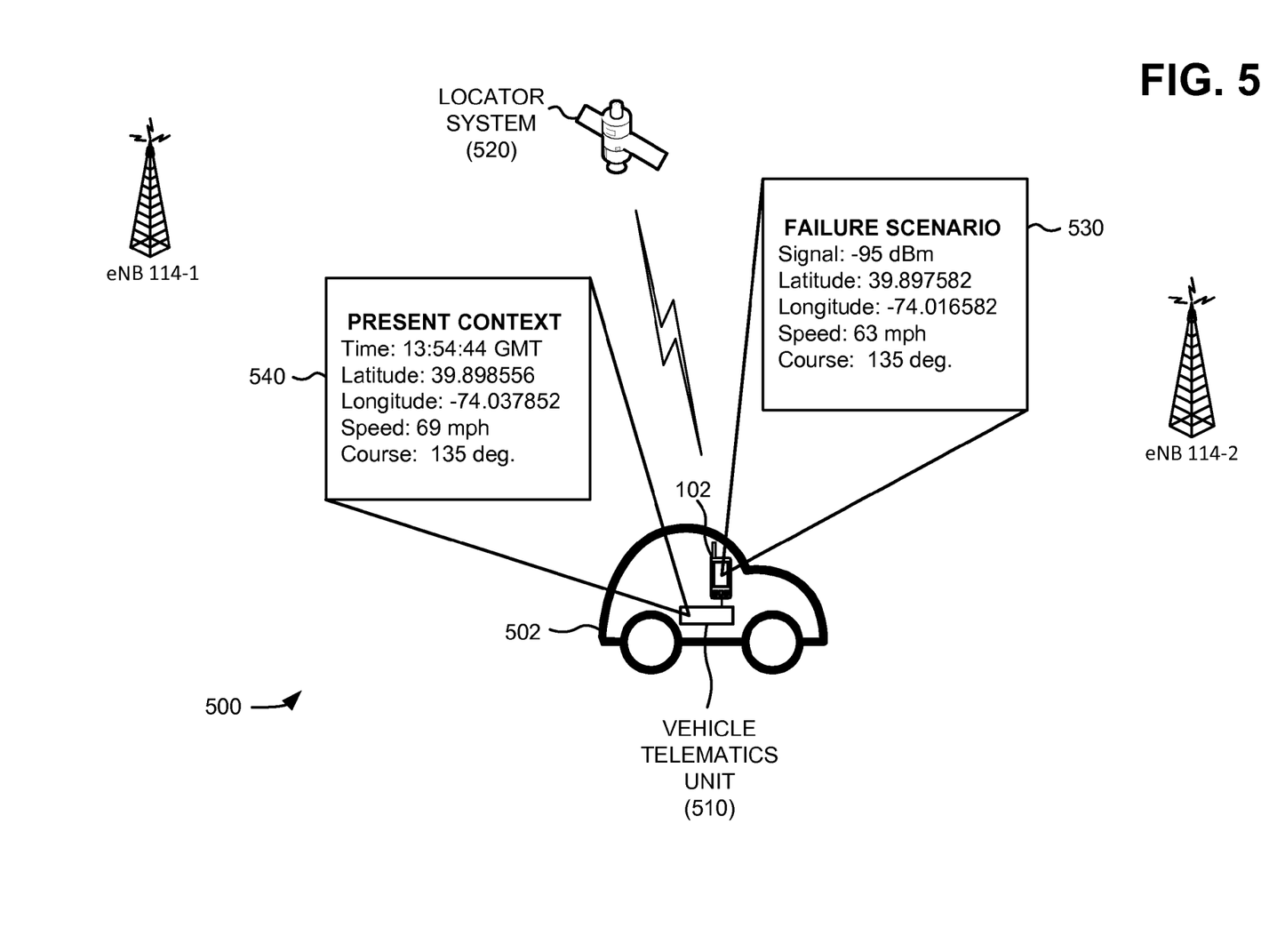
FIG. 5 is a diagram of an exemplary scenario according to an implementation described herein.

FIG. 5 is a diagram of an exemplary scenario 500 according to an implementation described herein. As shown in FIG. 5, scenario 500 includes UE device 102 in communication with a vehicle telematics unit 510 and a locator system 520. In the scenario of FIG. 5, UE device 102 is traversing in a vehicle 502 between areas covered by eNodeBs 114-1 and 114-2. UE device 102 and eNodeBs 114 may include features described above in connection with FIGS. 1A-4 above.

Vehicle telematics unit 510 may include a data collection system, configured for installation, or use, in a vehicle, that receives data generated by vehicle sensors and/or a vehicle electronic control unit (ECU). Vehicle telematics unit 510 may be a device installed by a vehicle manufacturer when the vehicle is made—this may be referred to as an original equipment manufacturer ("OEM") installation. Vehicle telematics unit 510 may also be an aftermarket device that plugs into a diagnostic port of a vehicle. The functionality of vehicle telematics device 510 may also be performed by UE 102 in communication, either wireless or wired, with either an OEM or aftermarket telematics device. Data from vehicle sensors may include, for example, acceleration, vehicle speed, locations, routes, etc. In one implementation, vehicle telematics unit 510 may include a device that is capable of communicating over access network 204 (FIG. 2). In another implementation, vehicle telematics unit 510 may communicate with UE device 102 via a wired or wireless connection. In implementations described herein, vehicle telematics unit 510 may receive information from vehicle sensors and/or the ECU and may transmit the information to UE device 102 at periodic intervals or in real time (e.g., when the vehicle associated with vehicle telematics unit 510 is operating). In another implementation, information from vehicle telematics unit 510 may be provided to another device (e.g., in EPC 206 or PDN 210) and then obtained by UE device 102.

Locator system 520 may include a satellite global positioning system (GPS), a cellular tower triangulation system, a WLAN access point locating system, a global navigation satellite system (GNSS), or another system that determines real-time (or near real-time) location information for subscribing devices, such UE device 102 and/or vehicle telematics unit 510. In one implementation, locator system 520 may include a satellite to broadcast information to UE device 102. In another implementation locator system 520 may include one or more other systems (e.g., a location information server) to gather/provide information about the position, direction, and/or destination of UE device 102.

Referring to FIG. 5, assume that a user of UE device 102 is driving a familiar route (e.g., a commuting route, a common local route, etc.) while UE device 102 is engaged in a VoLTE session facilitated through eNodeB 114-1. Further assume that the route includes a transition region between eNodeB 114-1 and eNodeB 114-2 with a known failure scenario 530 (e.g., previously identified by failure log unit 410 and included in failure log 110). As shown in FIG. 5, failure scenario 530 may include a particular context for previous failed RRC connection re-establishment attempts. The particular failure scenario 530 may include context values such as a signal strength (e.g., −95 dBm or decibel-milliwatts), coordinates (e.g., latitude/longitude coordinates), a speed (e.g., 63 mph), and a course (e.g., 135 degrees). While each value of the context values in failure scenario 530 are shown as a single number, in other implementations, failure scenario 530 may include a range of values (e.g., based on multiple RRC connection re-establishment failures), average values, threshold (e.g., minimum or maximum values), or approximated values.

UE device 102 (e.g., connection module 400) may collect context information from sensors within UE device 102 and/or other devices to detect if present data matches a known failure scenario, such as failure scenario 530. For example, UE device 102 may obtain present context information 540 from vehicle telematics unit 510. As shown in FIG. 5, present context information 540 may include a time (e.g., 13:54:44), coordinates (e.g., latitude/longitude coordinates), a speed (e.g., 69 mph), and a course (e.g., 135 degrees). While each value of present context information 540 is shown as a single number, in other implementations, present context information 540 may include a range of values (e.g., based on a time interval), average values, or approximate values. UE device 102 may also obtain signal strength values (e.g., from an internal RF power meter or similar component).

Based on information in failure scenario 530, UE device 102 may apply present context information 540 from vehicle telematics unit 510 and signal strength information from UE device 102 to determine if the present situational data matches the known failure scenario 530, or any known failure scenario stored in failure log unit 410. Assuming the present situational data matches failure scenario 530, UE device 102 may apply predictive intelligence to alter default procedures, for a handover between eNodeB 114-1 and eNodeB 114-2, to avoid dropping the active VoLTE session. For example, UE device 102 may reduce one or more wait timers for an RRC re-establishment request or select a different serving tower (e.g., eNodeB 114-2 instead of eNodeB 114-1) to direct an RRC re-establishment request 108.

Figure 6:
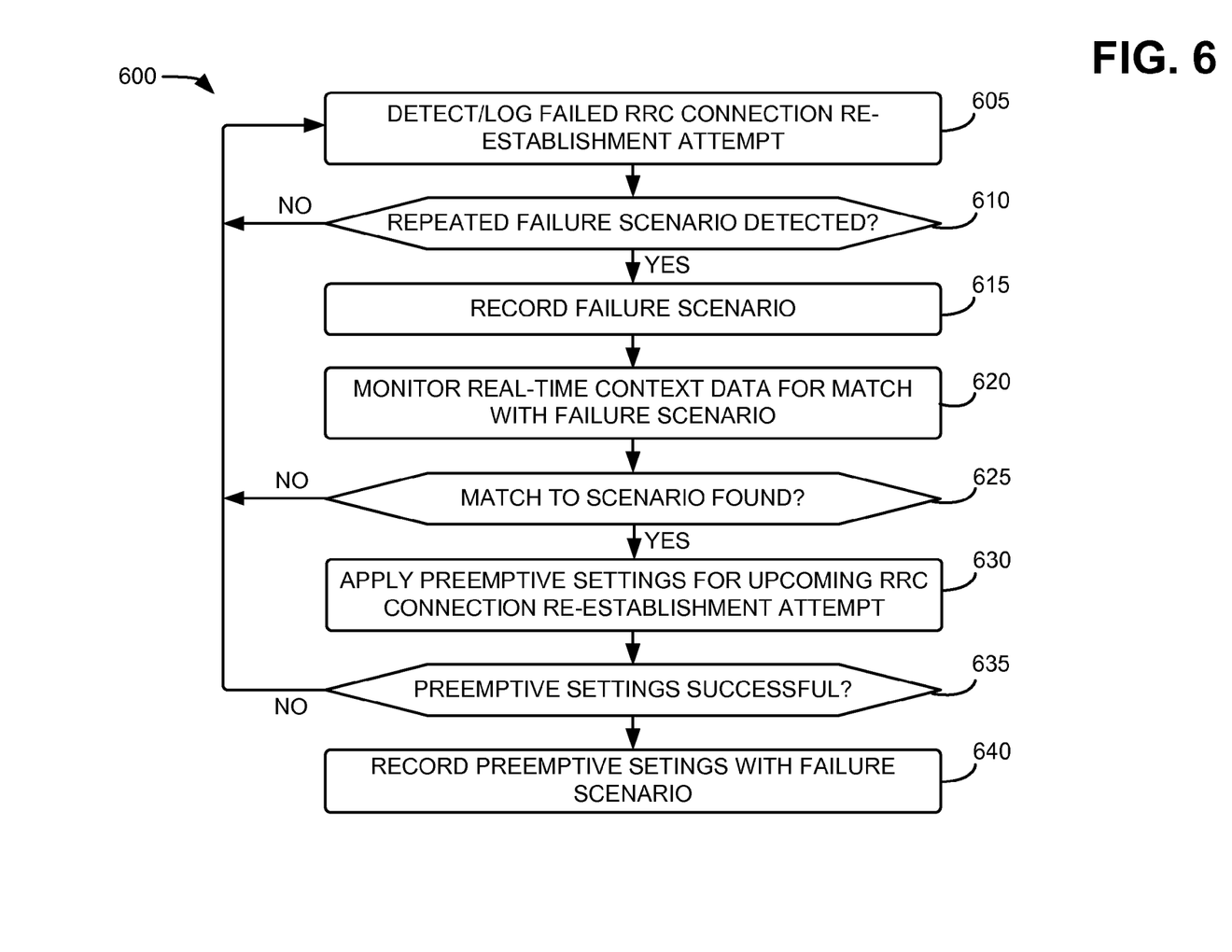
FIGS. 6 and 7 are flow diagrams illustrating an exemplary process for implementing intelligent radio resource control re-establishment, according to an implementation described herein.

FIG. 6 is a flow diagram illustrating an exemplary process 600 for implementing intelligent radio resource request re-establishment according to an implementation described herein. In one implementation, process 600 may be performed by UE device 102. In another implementation, some or all of process 600 may be performed by another device or group of devices, including UE device 102. For example, in one implementation, UE device 102 may perform one or more parts of process 600 in conjunction with telematics unit 510.

As shown in FIG. 6, process 600 may include detecting and logging a failed RRC connection re-establishment attempt (block 605). For example, UE device 102 (e.g., failure log unit 410) may monitor and record details of failed handovers and/or RRC connection re-establishment procedures for UE device 102. Failure log unit 410 may communicate with one or more other devices, such as telematics unit 510 or locator system 520, to collect context data that may be associated with a failed handover or RRC connection re-establishment attempt. Failure log unit 410 may store details of failed handovers and/or RRC connection re-establishment procedures in a failure log (e.g., failure log 110 in memory 320).

Process 600 may also include determining if the detected attempt indicates a repeated failure scenario (block 610) and, if the detected attempt indicates a repeated failure scenario (block 610—YES), recording the failure scenario (block 615). For example, UE device 102 (e.g., failure mode recognition module 420) may compare stored data from failure log unit 410 to identify a failure scenario. In one implementation, failure mode recognition module 420 may be configured to detect a particular number of failures with similar conditions before identifying a failure scenario. In other implementations, a single failed RCC re-establishment request may be identified as a failure scenario. Failure mode recognition module 420 may record the failure scenario, for example, in failure log 110 (e.g., in memory 320).

Process 600 may further include monitoring real-time context data for a match with the failure scenario (block 620), and determining if a match to a failure scenario is found (block 625). For example, UE device 102 (e.g., failure prediction module 430) may monitor current conditions, such as conditions corresponding to any of the data fields collected by failure log unit 410. UE device 102 may obtain real-time context data from internal components or external devices (such as telematics unit 510 or locator system 520. In one implementation, failure prediction module 430 may monitor conditions in real time to identify conditions that match a failure scenario in failure log 110.

If a match to a failure scenario is found (block 625—YES), process 600 may further include applying preemptive settings for a potential upcoming RRC connection re-establishment attempt (block 630) and determining if the preemptive settings are successful (block 635). For example, if UE device 102 (e.g., failure prediction module 430) matches current conditions to a known failure scenario, failure prediction module 430 can provide a signal to failure correction module 440 to initiate a preemptive corrective action. Failure correction module 440 may identify actions (e.g., beyond normal LTE default actions) to achieve a successful RRC re-establishment process, such as adjusting settings for wait timers or initiating preemptive handovers to avoid repeating a known failure scenario.

If the preemptive settings are successful (block 635—YES), process 600 may include recording the preemptive settings with the failure scenario (block 640). For example, UE device 102 (e.g., failure correction module 440) may monitor success of corrective attempts, such as a successful RCC re-establishment from eNodeB 114-1 to eNodeB 114-2. When a corrective attempt is successful to prevent a failed handover or failed RRC connection re-establishment procedure, failure correction module 440 may store the corrective action in association with the corresponding failure scenario (e.g., in failure log 110).

If the detected attempt does not indicate a repeated failure scenario (block 610—NO), or if a match to a failure scenario is not found (block 625—NO), or if the preemptive settings are not successful (block 635—NO), process 600 may return to block 605 to detect and log the failed RRC connection re-establishment attempt. For example, UE device 102 (e.g., failure log unit 410) may continue to log context data related to failed events to increase the sample size and utility of failure log 110.

Figure 7:
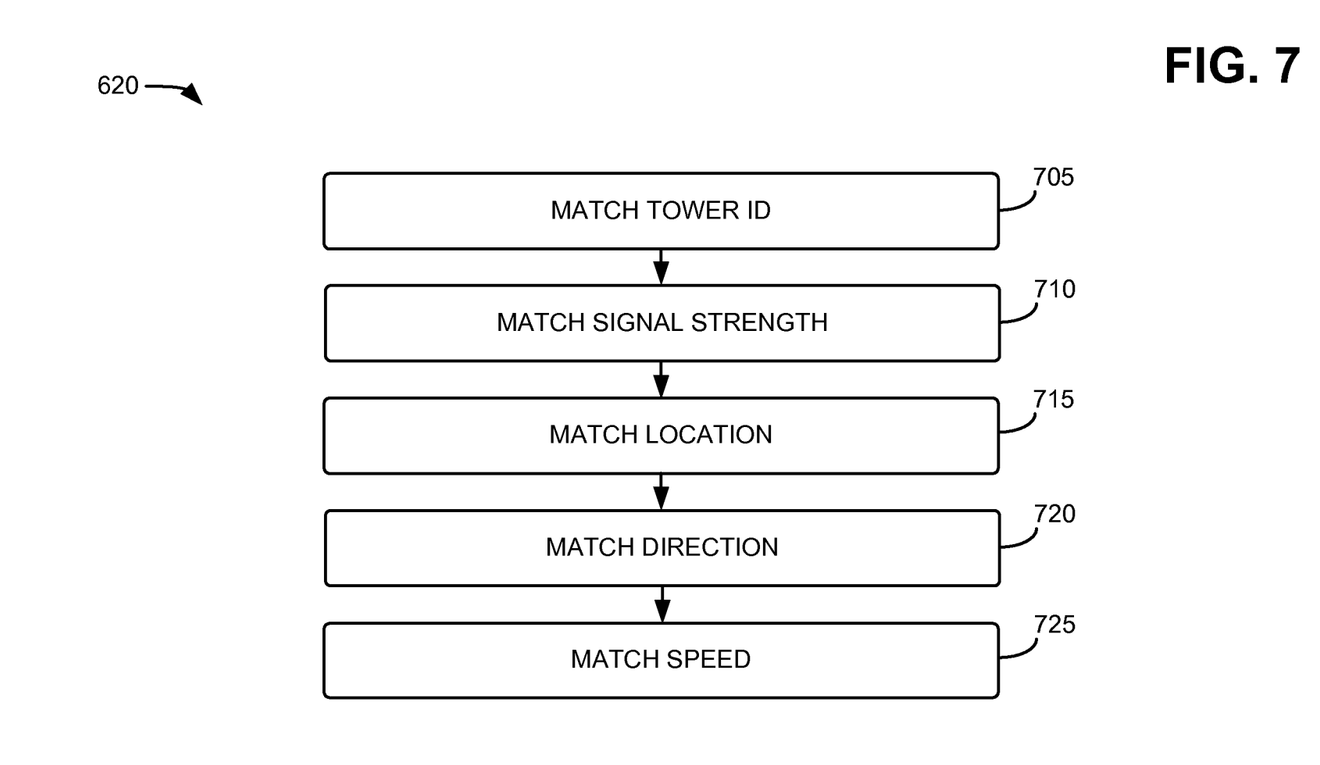

FIG. 7 provides additional aspects of process block 620. As shown in FIG. 7, process block 620 may further include matching a tower identifier (block 705), matching a signal strength (block 710), matching a location (block 715), matching a direction (block 720), and matching a speed (block 725). For example, UE device 102 (e.g., failure prediction module 430) may match real-time context data to store failure scenarios. In one implementation, UE device 102 may conserve computing resources by attempting to match particular data types/fields before attempting to match more narrow fields. For example, UE device 102 may seek to match a particular tower identifier (e.g., a particular identifier for an eNodeB 114) for a failure scenario before attempting to match a signal strength, a location, a direction, or a speed. Identifying a "match" may include identifying an exact match, identifying a value within a stored range of value, identifying a valued that exceeds (or falls short of) a stored value, identifying a value within a margin of error of a stored value, etc.

Matching a tower ID may include UE device 102 comparing an identifier from one or more current serving eNodeBs 114 with eNodeB identifiers in stored failure scenarios. Because each eNodeB 114 has a unique identifier, UE device 102 may look for an exact match. Matching a signal strength may include UE device 102 identifying a signal strength value that is below (e.g., weaker than) a threshold value in a stored failure scenario. In one implementation, matching a location may include UE device 102 identifying a set of real-time geographic coordinates that are within a particular range (e.g., within 500 ft.) of a location value in a stored failure scenario. In another implementation, a stored failure scenario may include a range and matching a location may include UE device 102 identifying a set of real-time geographic coordinates within the stored range. Matching a direction may include UE device 102 comparing a directional value from real-time data with a stored failure scenario value. A matching direction may include, for example, a direction within a few degrees of a stored value or an exact match. Matching a speed may include UE device 102 identifying a speed value that is above (e.g., faster than) a threshold value in a stored failure scenario.

According to implementations described herein, a mobile device may identify a failure scenario for previously-failed RRC connection re-establishment requests, from the mobile device, in a LTE network. The mobile device monitors real-time context data for a match with the failure scenario and applies preemptive settings for an upcoming RRC connection re-establishment attempt when there is a match with the failure scenario. The preemptive settings are configured to maintain an active session between the mobile device and the LTE network.

The systems and methods described herein may be implemented locally within a UE (UE device 102), such that improved handovers in typical problem environments can be achieved. The improved handovers can be achieved using individual solutions for each UE without changes (or with minimal changes) to network components or backend systems.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 6 and 7, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
identifying, by a mobile device, a failure scenario for previously-failed radio resource control (RRC) connection re-establishment requests, from the mobile device, in a Long-Term Evolution (LTE) network;
monitoring, by the mobile device, real-time context data for a match with the failure scenario; and
applying, by the mobile device, preemptive settings for an upcoming RRC connection re-establishment request in response to identifying a match with the failure scenario, wherein the preemptive settings are configured to maintain an active session between the mobile device and the LTE network.

2. The method of claim 1, wherein, the identifying a failure scenario includes:
logging, in a memory of the mobile device, context data for multiple failed RRC connection re-establishment attempts;
determining if a particular detected attempt indicates a repeated failure; and
recording context data for the repeated failure as the failure scenario when the particular detected attempt indicates a repeated failure.

3. The method of claim 1, further comprising:
performing the RRC connection re-establishment request using the preemptive settings;
determining if the RRC connection re-establishment request using the preemptive settings is successful; and
storing the preemptive settings associated with the failure scenario when the RRC connection re-establishment request was successful.

4. The method of claim 1, wherein the failure scenario includes context data at a time of sending a RRC connection re-establishment request, the context data including:
one or more RF signal strength values, and
location coordinates.

5. The method of claim 4, wherein the failure scenario further includes context data including:
a direction, and
a speed.

6. The method of claim 1, wherein the real-time context data includes data obtained from one or more external devices.

7. The method of claim 6, wherein the one or more external devices includes a vehicle telematics unit.

8. The method of claim 1, wherein the preemptive settings include:
adjusting a wait timer for the upcoming RRC connection re-establishment request, or
modifying selection of a default access node for sending the upcoming RRC connection re-establishment request.

9. The method of claim 1, further comprising:
applying, by the mobile device, default settings for the upcoming RRC connection re-establishment attempt when there is not a match with the failure scenario.

10. The method of claim 1, wherein monitoring the real-time context data for a match with the failure scenario includes identifying a match for a tower identifier prior to matching one or more of:
a signal strength value,
a location value,
a direction value, or
a speed value.

11. A mobile device, comprising:
one or more memories to store instructions; and
one or more processors configured to execute instructions in the one or more memories to:
identify a failure scenario for previously-failed radio resource control (RRC) connection re-establishment requests, from the mobile device, in a Long-Term Evolution (LTE) network;
monitor real-time context data for a match with the failure scenario; and
apply preemptive settings for an upcoming RRC connection re-establishment attempt in response to identifying a match with the failure scenario, wherein the preemptive settings are configured to maintain an active session between the mobile device and the LTE network.

12. The mobile device of claim 11, wherein the one or more processors are further configured to execute instructions in the one or more memories to:
perform the RRC connection re-establishment attempt using the preemptive settings;
determine if the RRC connection re-establishment attempt is successful; and
store, in the memory, the preemptive fix associated with the failure scenario when the RRC connection re-establishment attempt was successful.

13. The mobile device of claim 11, wherein, when identifying a failure scenario, the one or more processors are further configured to execute instructions in the one or more memories to:
log, in the one or more memories, context data for multiple failed RRC connection re-establishment attempts;
determine if a particular detected attempt indicates a repeated failure; and
record context data for the repeated failure as the failure scenario when the particular detected attempt indicates a repeated failure.

14. The mobile device of claim 11, wherein the failure scenario includes context data associated with sending a RRC connection re-establishment request, the context data including:
one or more RF signal strength values, and
location coordinates for the mobile device.

15. The mobile device of claim 11, wherein the failure scenario includes context data associated with sending a RRC connection re-establishment request, the context data including:
a direction of the mobile device, and
a speed of the mobile device.

16. The mobile device of claim 11, wherein, when monitoring real-time context data, the one or more processors are further configured to execute instructions in the one or more memories to:
obtain data from one or more of a locator system or a vehicle telematics unit.

17. A non-transitory computer-readable medium storing instructions executable by a mobile device to:
identify a failure scenario for previously-failed radio resource control (RRC) connection re-establishment requests, from the mobile device, in a Long-Term Evolution (LTE) network;
monitor real-time context data for a match with the failure scenario; and
apply preemptive settings for an RRC connection re-establishment attempt in response to identifying a match with the failure scenario, wherein the preemptive settings are configured to maintain an active session between the mobile device and the LTE network.

18. The non-transitory computer-readable medium of claim 17, further comprising instructions to:
apply default settings for the RRC connection re-establishment attempt when there is not a match with the failure scenario.

19. The non-transitory computer-readable medium of claim 17, further comprising instructions to:
log context data for multiple failed RRC connection re-establishment attempts;
determine if a particular detected attempt indicates a repeated failure; and
record context data for the repeated failure as the failure scenario when the particular detected attempt indicates a repeated failure.

20. The non-transitory computer-readable medium of claim 17, wherein the failure scenario includes context data at a time of sending a RRC connection re-establishment request, the context data including:
an eNodeB identifier,
one or more RF signal strength values,
location coordinates,
a direction, and
a speed.

* * * * *